US012548178B1

(12) United States Patent
Tang et al.

(10) Patent No.: US 12,548,178 B1
(45) Date of Patent: Feb. 10, 2026

(54) ROOM SCAN REFINEMENTS

(71) Applicant: Apple Inc., Cupertino, CA (US)

(72) Inventors: Feng Tang, Cupertino, CA (US); Joerg A. Liebelt, San Jose, CA (US); Yikang Liao, Sunnyvale, CA (US); Yang Yang, Sunnyvale, CA (US); Kai Kang, Sunnyvale, CA (US); Afshin Dehghan, San Jose, CA (US); Aditya Sankar, Seattle, WA (US); Hongyu Xu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 433 days.

(21) Appl. No.: 18/205,156

(22) Filed: Jun. 2, 2023

Related U.S. Application Data

(60) Provisional application No. 63/348,808, filed on Jun. 3, 2022.

(51) Int. Cl.
*G06T 7/593* (2017.01)
*G06T 7/13* (2017.01)
*G06V 10/764* (2022.01)

(52) U.S. Cl.
CPC ............. *G06T 7/593* (2017.01); *G06T 7/13* (2017.01); *G06V 10/764* (2022.01); *G06T 2207/10028* (2013.01)

(58) Field of Classification Search
CPC .. G06T 7/13; G06T 7/70; G06T 7/593; G06T 2207/10028; G06V 10/764; G06V 20/36
See application file for complete search history.

(56) References Cited

U.S. PATENT DOCUMENTS

| 11,252,329 B1* | 2/2022 | Cier ....................... H04N 23/53 |
| 11,651,533 B2* | 5/2023 | Zhang .................... G06T 15/10 |
| | | 345/419 |
| 2023/0106339 A1* | 4/2023 | Goyal ..................... G06T 7/13 |
| | | 345/634 |

OTHER PUBLICATIONS

Stojanovic, et al. (Generation Approximate 2D and 3D Floor Plans from 3D Point Clouds). (Year: 2019).*

* cited by examiner

*Primary Examiner* — Daniel G Mariam
(74) *Attorney, Agent, or Firm* — Thompson Hine LLP

(57) ABSTRACT

Various implementations disclosed herein include devices, systems, and methods that present a live view of a room based on two-dimensional (2D) images obtained during a scan. Sensor data is obtained during a scan of a room of a physical environment. The sensor data includes a 3D point cloud and a sequence of 2D images corresponding to captured views of the room. A shape representing an element of the room based on the sensor data is generated. A position of an edge of the shape is refined based on an image of the sequence of 2D images obtained during the scan of the room. A live view of the room is presented based on the sequence of 2D images obtained during the scan of the room, where the live view includes a line positioned based on the refined position of the edge of the shape.

20 Claims, 8 Drawing Sheets

ROOM SCAN REFINEMENTS

CROSS-REFERENCE TO RELATED APPLICATIONS

This application claims the benefit of U.S. Provisional Application Ser. No. 63/348,808 filed Jun. 3, 2022, which is incorporated herein in its entirety.

TECHNICAL FIELD

The present disclosure generally relates to electronic devices that use sensors to scan physical environments to generate three-dimensional (3D) models such as 3D room plans.

BACKGROUND

Existing scanning systems and techniques may be improved with respect to assessing and using the sensor data obtained during scanning processes to generate 3D representations such as 3D room plans representing physical environments and refining the 3D representations during the scanning processes.

SUMMARY

Various implementations disclosed herein include devices, systems, and methods that provide a live view of a room or other physical environment being scanned. The live view adds at least one line representing at least one edge of a shape representing an element of the room, e.g., an edge of a wall, window, or door, or an edge of a bounding box representing a 3D object such as a table, a chair, or an appliance. During the scan, the shape is generated and modified based on a 3D representation (e.g., a 3D point cloud) as that 3D representation is modified during the scan of the room. The shape's edge is projected onto the live view but (without refinement) may not line up well with the actual edge of the elements shown in the live view. To address this discrepancy, the edge is refined based on the live view data or other corresponding 2D image data, i.e., data separate from the 3D representation that is being modified and used to determine the shape. The result is that the line representing the edge in the live view may more accurately correspond to the wall edge, table bounding box edge, etc. depicted in the live view.

In some implementations, a 3D room plan is generated that combines 2D shapes representing elements of a room that are approximately planar (e.g., architectural elements such as walls, wall openings, windows, doors, etc.) with 3D primitives representing non-planar elements (e.g., tables, chairs, appliances, etc.). A 3D room plan is a 3D representation of a room or other physical environment that generally identifies or otherwise represents 3D positions of one or more walls, floors, ceilings, windows, doors, openings, and 3D objects (e.g., non-planar objects having significant height, width, and depth in 3 dimensions) within the environment. For example, a 3D floor plan using 2D shapes to represent walls, windows, doors, and other architectural elements of the room may be combined with 3D primitives such as 3D bounding boxes representing 3D objects within the physical environment to form a 3D room plan.

In general, one innovative aspect of the subject matter described in this specification can be embodied in methods that include the actions of, at an electronic device having a processor, obtaining sensor data during a scan of a room of a physical environment, the sensor data including a three-dimensional (3D) point cloud and a sequence of two-dimensional (2D) images corresponding to captured views of the room during the scan of the room, generating a shape representing an element of the room based on the sensor data during the scan of the room, refining a position of an edge of the shape based on an image of the sequence of 2D images obtained during the scan of the room, and presenting a live view of the room based on the sequence of 2D images obtained during the scan of the room, wherein the live view includes a line positioned based on the refined position of the edge of the shape.

These and other embodiments can each optionally include one or more of the following features.

In some aspects, the element includes a wall structure.

In some aspects, refining the position of the edge of the shape of the wall structure based on the image of the sequence of 2D images obtained during the scan includes determining an edge adjustment for each frame of a set of prior frames, and selecting one of the edge adjustments based on at least one of: (a) an edge pixel support, (b) a camera angle, (c) a visible size of a current frame, and (d) a timestamp.

In some aspects, refining the position of the edge of the shape of the wall structure based on the image of the sequence of 2D images during the scan of the room includes determining an edge adjustment for each frame of a set of prior frames, and blending one or more edge adjustments based on at least one of: (a) an edge pixel support, (b) a camera angle, (c) a visible size of a current frame, and (d) a timestamp.

In some aspects, determining the edge adjustment for each frame is based on 3D semantic data determined from the sensor data during the scan of the room.

In some aspects, the element includes an object in the room. In some aspects, generating the shape representing the element of the room includes determining a 3D primitive representing the object based on the sensor data during the scan of the room.

In some aspects, refining the position of the edge of the shape based on an image of the sequence of 2D images obtained during the scan of the room includes detecting one or more edges for a set of images in the sensor data, blurring the set of images, generating a series of bounding box proposals based on the blurred set of images, wherein each bounding box of the series of bounding box proposals varies based on edge adjustments in a different directions, scoring the series of bounding box proposals based on the detected on or more edges, and selecting a bounding box from the series of bounding box proposals to use to adjust the shape based on the scoring.

In some aspects, generating the shape representing the element of the room based on the sensor data during the scan of the room includes detecting walls and wall openings. In some aspects, generating the shape representing the element of the room based on the sensor data during the scan of the room includes detecting windows or doors on walls of the room.

In some aspects, the live view of the room includes a first field of view that is different than a second field of the view of the captured views of the room during the scan.

In some aspects, the shape includes one or more parameters defining a position or size of the shape that are modified during the scan of the room.

In some aspects, the sequence of 2D images includes light intensity image data. In some aspects, the sequence of 2D images includes filtered semantic data.

In some aspects, the 3D point cloud is associated with 3D semantic data that includes semantic labels associated with at least a portion of 3D points within the 3D point cloud. In some aspects, the semantic labels identify walls, wall structures, objects, and classifications of the objects of the room. In some aspects, the live view of the room includes a floorplan that is produced during the scan.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
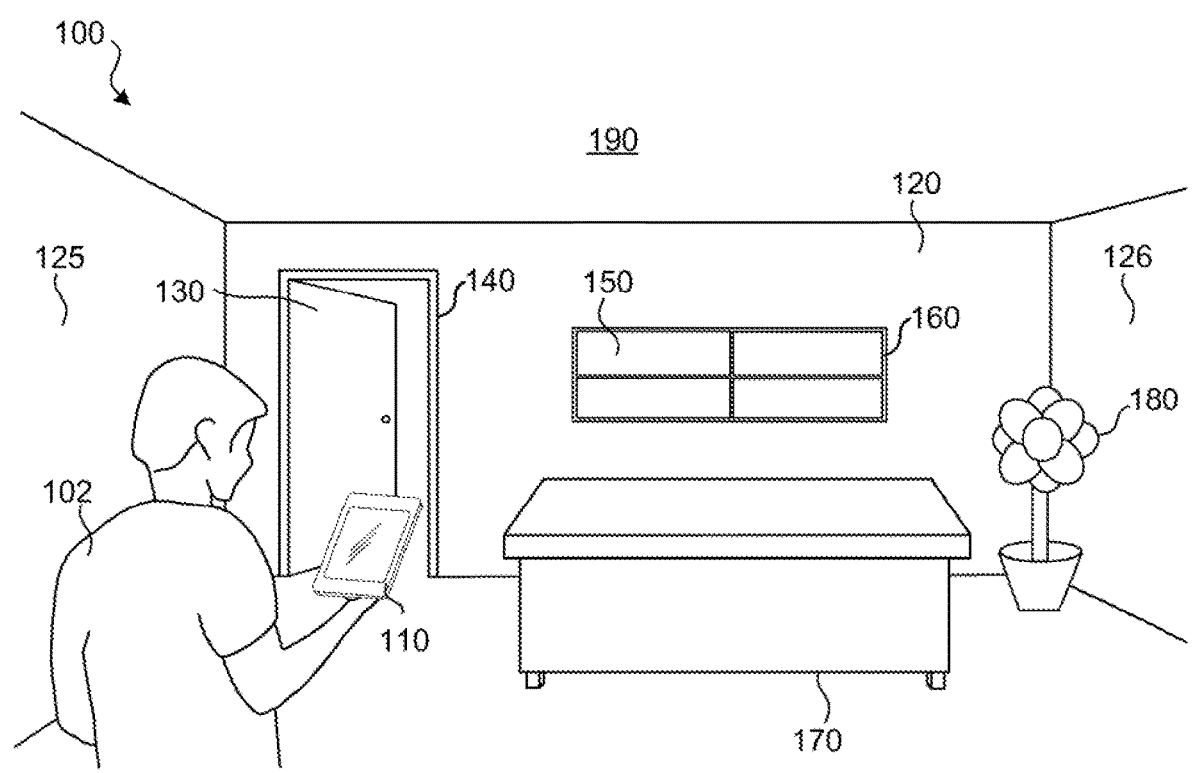
FIG. 1 illustrates an electronic device in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary physical environment 100. FIG. 1 illustrates an exemplary electronic device 110 operating in a room of the physical environment 100. In this example, the room includes a door 130 providing an opening leading to a second room of the physical environment 100 which may or may not also be included in the 3D room plan. The room also includes a door frame 140, a window 150 (with window frame 160) on wall 120, wall 125, wall 126, ceiling 190, a desk 170, and potted flowers 180.

The electronic device 110 is illustrated as a single, handheld device. The electronic device 110 may be a mobile phone, a tablet, a laptop, and so forth. In some implementations, electronic device 110 is worn by a user. For example, electronic device 110 may be a watch, a head-mounted device (HMD), a head-worn device (glasses), headphones, an ear-mounted device, and so forth. The device 110 utilizes one or more display elements to present views. For example, the device 110 can display views that include content in the context of an extended reality (XR) environment. In some implementations, the device 110 may enclose the field-of-view of the user 102. In some implementations, the functionalities of device 110 are provided by more than one device. In some implementations, the device 110 communicates with a separate controller or server to manage and coordinate an experience for the user. Such a controller or server may be located in or may be remote relative to the physical environment 100.

The electronic device 110 includes one or more cameras, microphones, depth sensors, motion sensors, or other sensors that can be used to capture information about and evaluate the physical environment 100. The obtained sensor data may be used to generate a 3D representation, such as a 3D point cloud, a 3D mesh, a 3D floor plan, and/or a 3D room plan.

In one example, the user 102 moves around the physical environment 100 and the device 110 captures sensor data from which one or more 3D room plans of the physical environment 100 are generated. The device 110 may be moved to capture sensor data from different viewpoints, e.g., at various distances, viewing angles, heights, etc. The device 110 may provide information to the user 102 that facilitates the scanning process. For example, the device 110 may provide a view from a camera feed showing the content of RGB images currently being captured, e.g., a live camera feed presented on the device 110 during the scanning process. As another example, the device 110 may provide a view of a live generated 3D point cloud, a live generated 3D floor plan, or a live generated 3D room plan to facilitate the scanning process or otherwise provide feedback that informs the user 102 of which portions of the physical environment 100 have already been captured in sensor data and which portions of the physical environment 100 require more sensor data in order to be represented accurately in a 3D representation, 3D floor plan, and/or 3D room plan.

The device 110 performs a scan of the room to capture data from which a 3D room plan 300 (FIG. 3-5) of the room is generated. In this process, for example, a dense point-based representation, such as a 3D point cloud 200 (FIG. 2), may be generated to represent the room and used to generate the 3D room plan 300, which may include a (a) 3D floor plan represent the 3D positions of the walls, wall openings, windows, doors, and (b) representations of 3D objects of the room. In some implementations, a 3D room plan defines the positions of such elements using non-point cloud data/non-mesh data, for example, using one or more parametric representations. For example, such a parametric representation may define 2D shapes and 3D primitives that represent the positions and sizes of elements of a room in the 3D room plan. In some implementations, a 3D room plan of a room is generated based on a 3D point cloud that is generated during a scan of the room, e.g., a scan captured as user 102 walks around the room capturing sensor data.

Figure 2:
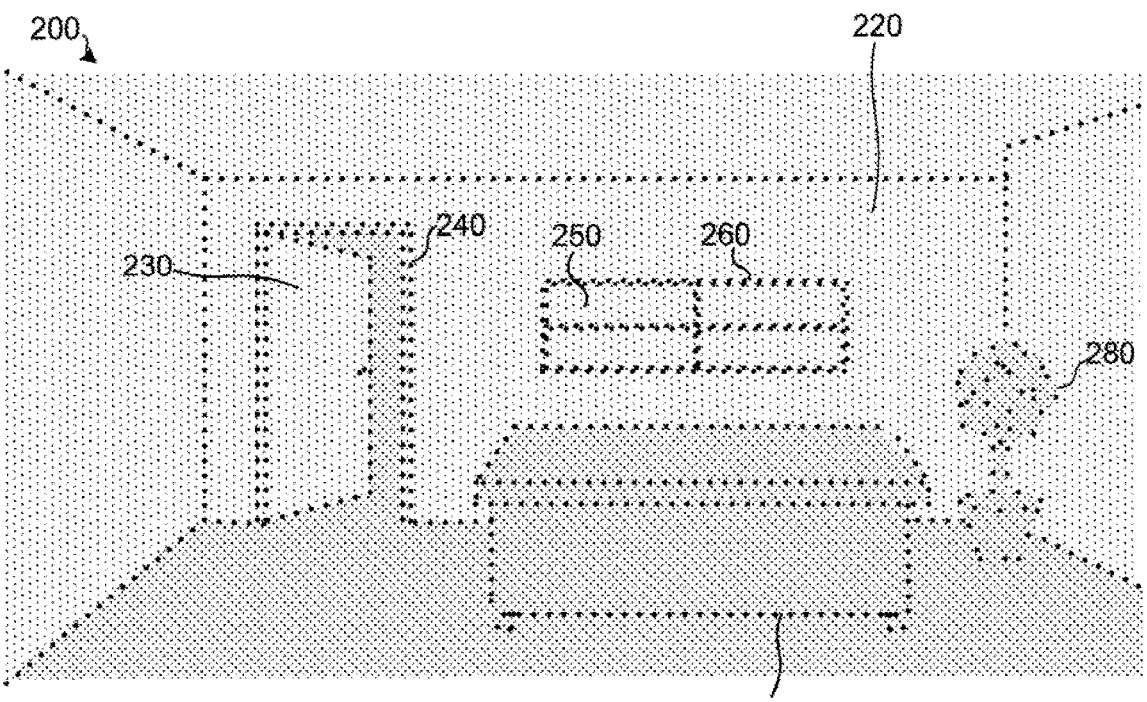
FIG. 2 illustrates a portion of a 3D point cloud representing the room of FIG. 1 in accordance with some implementations.

FIG. 2 illustrates a portion of a 3D point cloud representing the room of FIG. 1. In some implementations, the 3D point cloud 200 is generated based on one or more images (e.g., greyscale, RGB, etc.), one or more depth images, and motion data regarding movement of the device in between different image captures. In some implementations, an initial 3D point cloud is generated based on sensor data and then the initial 3D point cloud is densified via an algorithm, machine learning model, or other process that adds additional points to the 3D point cloud. The 3D point cloud 200 may include information identifying 3D coordinates of points in a 3D coordinate system. Each of the points may be associated with characteristic information, e.g., identifying a color of the point based on the color of the corresponding portion of an object or surface in the physical environment 100, a surface normal direction based on the surface normal direction of the corresponding portion of the object or surface in the physical environment 100, and a semantic label identifying the type of object with which the point is associated, etc.

In alternative implementations, a 3D mesh is generated in which points of the 3D mesh have 3D coordinates such that groups of the mesh points identify surface portions, e.g., triangles, corresponding to surfaces of the room of the physical environment 100. Such points and/or associated mesh shapes (e.g., triangles) may be associated with color, surface normal directions, and/or semantic labels.

In the example of FIG. 2, the 3D point cloud 200 includes a set of points 220 representing wall 120, a set of points 230 representing door 130, a set of points 240 representing the door frame 240, a set of points 250 representing the window 150, a set of points 260 representing the window frame 160, a set of points 270 representing the desk 170, and a set of points 280 representing the potted flowers 180. In this example, the points of the 3D point cloud 200 are depicted with relative uniformity and with points on object edges emphasized to facilitate easier understanding of the figures. However, it should be understood that the 3D point cloud 200 need not include uniformly distributed points and need not include points representing object edges that are emphasized or otherwise different than other points of the 3D point cloud 200.

The 3D point cloud 200 may be used to identify one or more boundaries and/or regions (e.g., walls, floors, ceilings, etc.) within the room of the physical environment 100. The relative positions of these surfaces may be determined relative to the physical environment 100 and/or the 3D point-based representation 200. In some implementations, a plane detection algorithm, machine learning model, or other technique is performed using sensor data and/or a 3D point-based representation (such as 3D point cloud 200). The plane detection algorithm may detect the 3D positions in a 3D coordinate system of one or more planes of physical environment 100. The detected planes may be defined by one or more boundaries, corners, or other 3D spatial parameters. The detected planes may be associated with one or more types of features, e.g., wall, ceiling, floor, table-top, counter-top, cabinet front, etc., and/or may be semantically labelled. Detected planes associated with certain features (e.g., walls, floors, ceilings, etc.) may be analyzed with respect to whether such planes include windows, doors, and openings. Similarly, the 3D point cloud 200 may be used to identify one or more boundaries or bounding boxes around one or more objects, e.g., bounding boxes corresponding to desk 170 and flowers 180.

Figure 3:
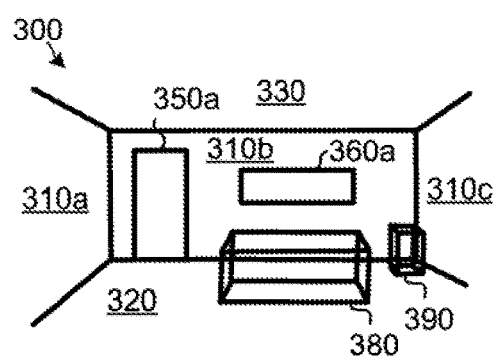
FIG. 3 illustrates a portion of a 3D floor plan representing a room of FIG. 1, in accordance with some implementations.
Figure 4:
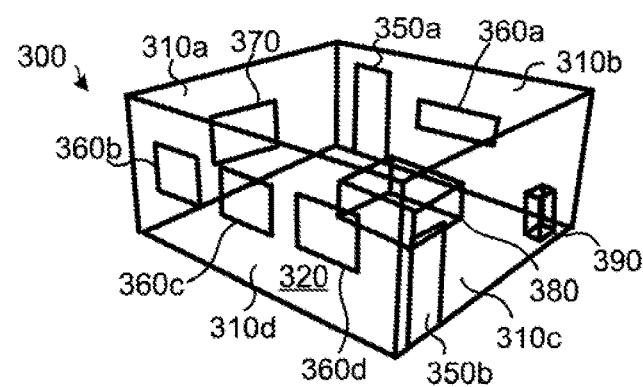
FIG. 4 is a view of the 3D floor plan of FIG. 3.
Figure 5:
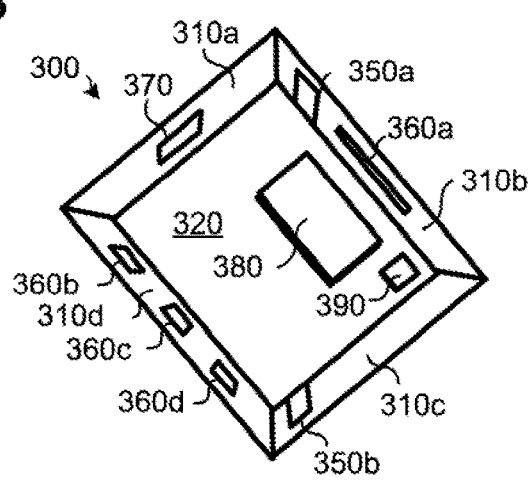
FIG. 5 is another view of the 3D floor plan of FIGS. 3 and 4.

The 3D point cloud 200 is used to generate room plan 300 (as illustrated in FIGS. 3-5) representing one or more rooms of the physical environment 100 of FIG. 1. For example, detected planes, boundaries, bounding boxes, etc. may be detected and used to generate shapes, e.g., 2D shapes and/or 3D primitives that parametrically represent the elements of the room of the physical environment 100. In FIGS. 3-5, wall representations 310*a-d* represent the walls of the room (e.g., wall representation 310*b* represents wall 120), floor representation 320 represents the floor of the room, door representations 350*a-b* represent the doors of the room (e.g., door representation 350*a* represents door 130), window representations 360*a-d* represent the windows of the room (e.g., window representation 360*a* represents window 150), television representation 370 represents a television hanging on the wall 125, desk representation 380 is a bounding box representing desk 170, and flowers representation 390 is a bounding box representing flowers 180. A bounding box representation may have 3D dimensions that correspond to the dimensions of the object itself, providing a simplified yet scaled representation of the object. In this example, the 3D room plan 300 includes object representations for non-room-boundaries, e.g., for 3D objects within the room such as desk 170 and flowers 180, and thus represents more than just the approximately planar, architectural floor plan elements. In other implementations, a 3D room plan is simply a 3D floor plan, representing only planar, architectural floor plan element, e.g., walls, floor, doors, windows, etc.

Figure 6:
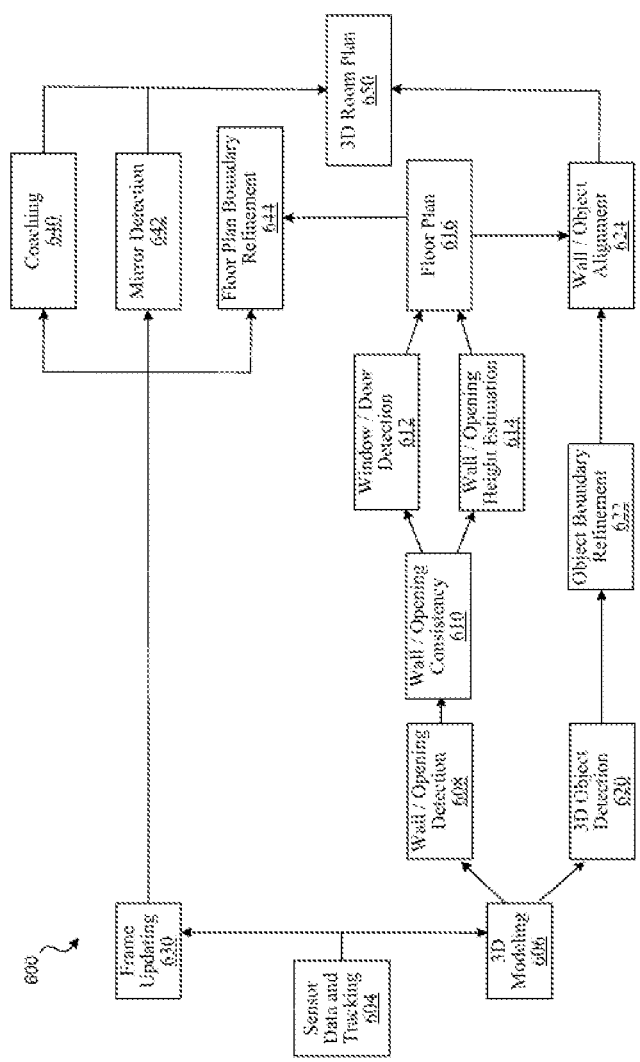
FIG. 6 is flow chart illustrating an exemplary 3D room plan generation pipeline in accordance with some implementations.

FIG. 6 is flow chart illustrating an exemplary 3D room plan generation pipeline 600, which may be executed at a device such as device 110 of FIG. 1. In this pipeline 600, sensor data is obtained at sensor data and tracking block 604. Such sensor data may include captured images, depth sensor data, ambient light sensor data, motion sensor data and/or any other type of sensor data useful in scanning, providing, feedback, and/or 3D room scan generation. At sensor data and tracking block 604, the device may track its pose (i.e., position and/or orientation) as the device captures the sensor data. Data from the sensor data and tracking block 604 is used at 3D modeling block 606.

The 3D modeling block 606 may use the sensor data (e.g., during the scanning of the physical environment) to generate and update a 3D model (e.g., a 3D point cloud or 3D mesh) representing the physical environment. As more and more sensor data is received and processed, the 3D model may be refined and updated. Such updating may occur live during the scanning process and/or after the scanning process concludes. The 3D modeling block 606 may provide a 3D model that includes points or mesh polygons that correspond to surface portions of the physical environment. Such points and/or mesh polygons may each have a 3D position and be associated with additional information including, but not limited to, color information, surface normal information, and semantic label information, e.g., identifying the type of object each point, or mesh polygon corresponds. The color, surface normal, and semantic information may be determined based on evaluating the sensor data, for example, using an algorithm or machine learning model. The 3D modeling block 606 may provide a 3D model to the wall/opening detection block 608 and/or to the 3D object detection block 620. The 3D model that is provided to these blocks 608, 610 may be updated over time, e.g., during the capturing of sensor data during scanning process and/or after the scanning process.

The wall/opening detection block 608 uses the 3D model to detect walls and openings within the physical environment. This may involve predicting planar surfaces corresponding to walls, floors, ceilings, etc. and/or boundaries of such planar surfaces. In some implementations, a machine learning model evaluates the 3D model and/or sensor data to identify planar surfaces and/or to detect the walls, openings, etc. This may involve using positional and additional information associated with points/mesh polygons of the 3D model. For example, this may involve using the positions, colors, surface normal, and/or semantics associated with the points/mesh polygons of the 3D point cloud or 3D mesh.

The wall/opening consistency block 610 uses the detected walls, openings, etc. and compares them with other data to ensure that the positioning, sizes, shapes, etc. of the walls, openings, etc. are consistent with one another. The wall/opening consistency block 610 provides the adjusted walls, openings, etc. to the window/door detection block 612 and the wall/opening height estimation block 614.

The window/door detection block 612 detects windows and doors on the walls. Such detection may utilize the 3D model from block 606, sensor data from block 604, and/or data about the walls, openings, etc. from block 610. In some implementations, the window/door detection block 612 detects points/mesh polygons of the 3D model that are within a threshold distance of a detected wall, opening, etc. and associates those points/mesh polygon vertices with the wall. For example, this may involve projecting some point cloud points onto the plane of the wall. Windows, doors, etc. may be detected based on the projected points with or without semantic information. In some implementations, an algorithm or machine learning model interprets the 3D model and detected walls, openings, etc. to predict the locations and sizes of windows, doors, etc.

The wall/opening height estimation block 614 estimates the heights of walls and openings. Such detection may utilize the 3D model from block 606, sensor data from block 604, and/or data about the walls, openings, etc. from block 610. Such detection may include the use of an algorithm or machine learning model.

The output of blocks 612, 614 is used to produce a 3D floor plan at block 616 that specifies the locations and sizes of elements of the physical environment that are approximately planar/architectural, e.g., walls, floors, ceilings, openings, windows, doors, etc. Such a 3D floor plan may represent the planar elements of the physical environment parametrically, e.g., by specifying positions of two or more points that provide sufficient information to form a rectangle, polygon, or other 2D shape, e.g., opposing corner points defining a rectangles shape and position within a 3D coordinate system. In some implementations, approximately planar/architectural, e.g., walls, floors, ceilings, openings, windows, doors, etc. have some thickness and are represented, for example, using parameters that specify a 2D shape and a thickness.

The 3D model from block 606 is also output to 3D object detection block 620. The 3D object detection block 620 may detect objects such as tables, televisions, screens, refrigerators, fireplaces, shelves, ovens, chairs, stairs, sofas, dishwashers, cabinets, stoves, beds, toilets, washers, dryers, sinks, bathtubs, etc. Such detection may utilize the 3D model from block 606 and/or sensor data from block 604. Such detection may include the use of an algorithm or machine learning model. In some implementations, a machine learning model evaluates the 3D model and/or sensor data to identify bounding boxes or other primitive shapes around 3D objects. This may involve using positional and additional information associated with points/mesh polygons of the 3D model. For example, this may involve using the positions, colors, surface normal, and/or semantics associated with the points/mesh polygons of the 3D point cloud or 3D mesh. As a specific example, a group of points corresponding to a table type object may be identified based on the semantic labels associated with the points of a point cloud. A bounding box around these points may be determined based on the location of the points. Such a bounding box may be oriented based on surface normal of the points, e.g., so that the bounding box orientation matches the orientation of the table.

At the object boundary refinement block 622 the boundaries of 3D objects detected at block 620 are refined. Such refinement may utilize the 3D model from block 606, sensor data from block 604, the 3D objects detected at block 620. The sensor data from block 640 may include frame updates from block 630, e.g., sensor data associated images that are used to provide a live preview during the scan, semantically-labeled images, etc. Such refinements may be used by coaching block 640 or otherwise to provide feedback to the user by adjusting the locations of object representations (e.g., bounding box edges) that may not line up precisely with corresponding real-world edges depicted in live image data. Thus, in some implementations, the refinements may be used to display edge indications over a live view during the scan. In some implementations, such refinements are used only for live view augmentation during scanning. In some implementations, such refinements are used only to improve the 3D object representations for use in generating the 3D room plan. In some implementations, such refinements are used for both. The unrefined and/or refined 3D objects may be provided to wall/object alignment block 624.

The wall/object alignment block 624 adjusts the 3D object representations (e.g., the 3D bounding box representations) based on floor plan 616. For example, a 3D bounding box for table located close to a wall may be adjusted to be parallel to the wall, against the wall, etc. In some implementations, 3D objects representations that are withing a threshold distance of a wall of the floor plan 616 are automatically adjusted to be aligned with the wall.

The output of wall/object alignment block 624 provides bounding boxes or other 3D primitive representations of 3D objects for use in generating the 3D room plan 650.

The 3D primitive representation may represent a 3D object parametrically, e.g., by specifying positions of two or more vertices that provide sufficient information to form a 3D box, cone, cylinder, wedge, sphere, torus, pyramid, etc., e.g., opposing corner points defining a 3D box's shape and position within a 3D coordinate system.

The sensor data and tracking block 604 also provides data used by frame updating block 630. Frame updating block 630 includes 2D frame data captured in the physical environment during the scan. It may include frame-based data (e.g., 2D images, 2D depth images, semantically-labelled 2D image, etc.) that is captured at a relatively fast rate during the scan. The frame data may be updated at a rate that is faster than the updating of the 3D model at 3D modeling block 606. Frame updating block 630 provides 2D frame data to the coaching block 640, mirror detection block 642, and floor plan boundary refinement block 644.

Coaching block 640 may provide guidance or other information during the scanning process to facilitate the scanning process. For example, it may provide a live view of image data being captured, e.g., via pass through video, identify how the user should move the device to capture data for yet-to-be captured portions of the physical environment, guide the user to take actions to improve the quality of the image capture, e.g., to move more slowly, rescan an area, move to scan a new area, increase ambient lighting, etc.

Mirror detection block 642 uses the 2D frame data from frame updating block 630 to detect mirrors in the physical environment. Mirror detection may involve an algorithm or machine learning process configured to detect reflective surfaces within the physical environment. The mirror detection block 642 may provide information about detected mirror that is used to generate the 3D room plan 650.

The floor plan boundary refinement block 644 uses the 2D frame data from frame updating block 630 and the floor plan 616 to determine refinements to the floor plan. Such refinements may be used by coaching block 640 or otherwise to provide feedback to the user about the locations of wall edges and other boundaries determined for the floor plan 616 that may not line up precisely with corresponding real-world edges depicted in live image data. Thus, in some implementations, the refinements of the floor plan may be used to display edge indications over a live view during the scan. The floor plan boundary refinement may involve using 2D RGB images, 2D semantically-labelled images, 2D depth data or other 2D data obtained or generated therefrom to determine adjustments to boundaries of walls, openings, windows, doors, etc. in the floor plan. In some implementations, such refinements are used only for providing augmentations to a live view during scanning. In some implementations, such refinements are used only to improve the floor plan 616 that is used to generate the 3D room plan 650. In some implementations, such refinements are used both.

The 3D room plan 650 thus combines a floor plan 616 having 2D shapes representing walls, openings, doors, windows, and other planar/architectural elements with 3D object representations from block 624. It may additionally account for information from coaching block 640 and mirror detection 642. The resulting 3D room plan 650 may be generated efficiently and accurately due to the relatively high-level/parametric representations. In some implementations, the 3D room plan 650 is generated relatively quickly, e.g., during or shortly after the scanning of the physical environment and does not require significant waiting (e.g., minutes, hours, days, etc.) for significant manual modification or other post-processing procedures.

The use of parametric representations to define a 3D room plan 350 may enable defining the 3D room plan 350 using a simple, compact data set that can be efficiently stored, managed, rendered, modified, shared, transmitted, or otherwise used. Such a 3D room plan may provide significant advantages over a non-parametrically-defined 3D room plan such as a room plan utilize dense point clouds or 3D meshes having hundreds or thousands of vertices representing hundreds or thousands of triangular faces. A parametric representation may utilize 3D bounding shapes that are primitives to represent the shapes of tables, objects, appliances, etc. Such representations may significantly simplify details while still providing a 3D room plan that accurately models significant aspects of the room.

FIGS. 7A-7D illustrate an exemplary view 700 of an electronic device (e.g., device 110 of FIG. 1) based on a sequence of images obtained during a scan of the physical environment (e.g., physical environment 100) in accordance with some implementations. The view 700 may be a live camera view of the physical environment 100, a view of the physical environment 100 through a see-through display, or a view generated based on a 3D model corresponding to the physical environment 100, such as such as a 3D point cloud 200 (FIG. 2) that may be generated to represent the room and used to generate a 3D room plan 300, generated via the process discussed with respect to FIGS. 2-6. The view 700 includes depictions of aspects of the physical environment 100 such as wall representations 710a-c represent the walls of the room (e.g., wall representation 710b represents wall 120), floor representation 720 represents the floor of the room, ceiling representation 790 represents ceiling 190, door representation 730 represents the door 130, window representation 750 represent the window 150, window frame representation 160 represents window frame 160, television representation 735 represents a television hanging on the wall 125 (not within view of FIG. 1), desk representation 770 represents desk 170, and flowers representation 780 represents the potted flowers 180.

The view 700 includes lines (shown as bolded lines in FIGS. 7A-7D) representing edges of one or more shapes representing 2D or 3D elements detected in the physical environment. For example, the elements may include 2D wall structures such as a door 130, doorway 140, wall 120, etc., and edge lines may be presented to the user during a live view (e.g., line 742 illustrates the detected edge of the representation 740 of the doorway 140). Additionally, the elements may include 3D objects such as desk 170 and flowers 180, and bounding box lines may be presented to the user during a live view as a bounding box is generated and/or refined during a scanning process (e.g., bounding box line 772 illustrates a bounding box being generated/refined for the representation 770 of the desk 170).

Figure 7A:
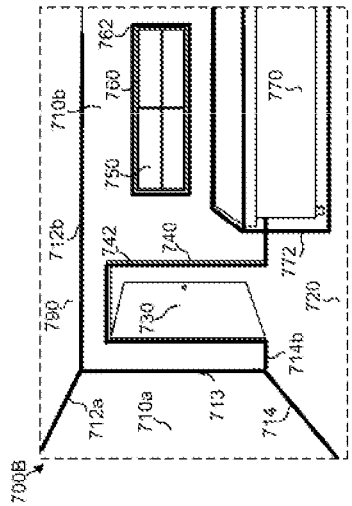
FIGS. 7A-7D illustrate exemplary views of the electronic device of FIG. 1 based on a sequence of images obtained during a scan of the physical environment in accordance with some implementations.
Figure 7B:
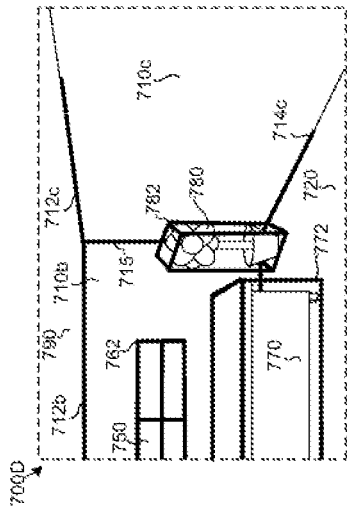
Figure 7C:
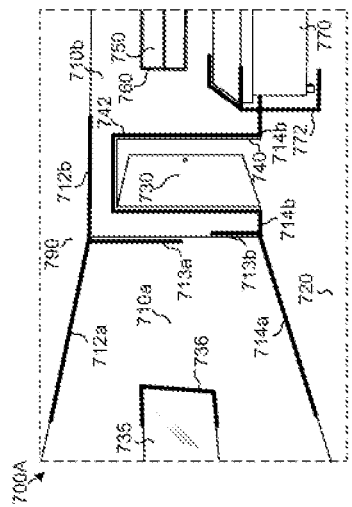
Figure 7D:
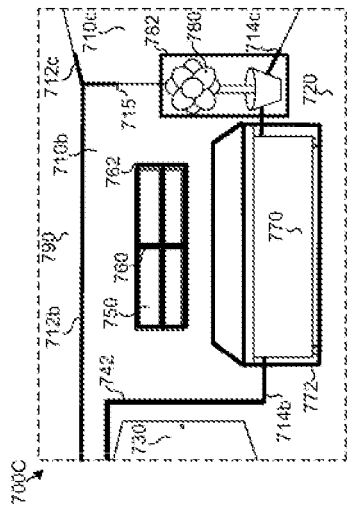

FIG. 7A illustrates a view 700A during a beginning of a scanning process of the room of the physical environment 100 (e.g., an initial series of captured frames). For example, view 700A illustrates the user 102 beginning a scan of the room starting with the wall 125 (e.g., where the television is hanging—not depicted in FIG. 1). As the user scans the room in FIGS. 7A-7D (e.g., user 102 holds the device 110 towards the room so that a sensor on the device can obtain sensor data of the room) from facing towards the left wall 125 in view 700A, along the back wall 125 in view 700B and view 700C, to the right wall 126 in view 700D, the views 700A-700D are updated accordingly. Additionally, during the scan of the room, the lines corresponding to the detected 2D and 3D elements are being generated and/or refined based on the sequence of images obtained during the scan of the room. The lines are overlayed on top of the representations of the physical environment for the XR view (e.g., augmented reality of virtual lines viewed on top of the view of the physical environment during a live view). For example, for the edges of the 2D elements for the detected walls, ceiling, and floor, lines 712a-c represents the corner of the representation 790 of the ceiling 190 and the wall representations 710a-c, lines 713a-b represents the corner between the wall representation 710a and the wall representation 710b, line 715 represents the corner between the wall representation 710b and the wall representation 710c, lines 714a-c represents the corner of the floor representation 720 of the floor 120 and the wall representations 710a-c. For the edges of the 2D elements for the detected doors, doorways, and windows, line 742 represents the edge of the representation 740 of the doorway 140, line 762 represents the edge of the representation 760 of the window frame 160 around the window 150. For the edges of the 3D elements for the detected objects, line 736 represents the bounding box edges for the television representation 735, line(s) 772 represents the bounding box edges for the representation 770 of the desk 170, and line(s) 782 represents the bounding box edges for the representation 780 of the flowers 180.

Figure 8:
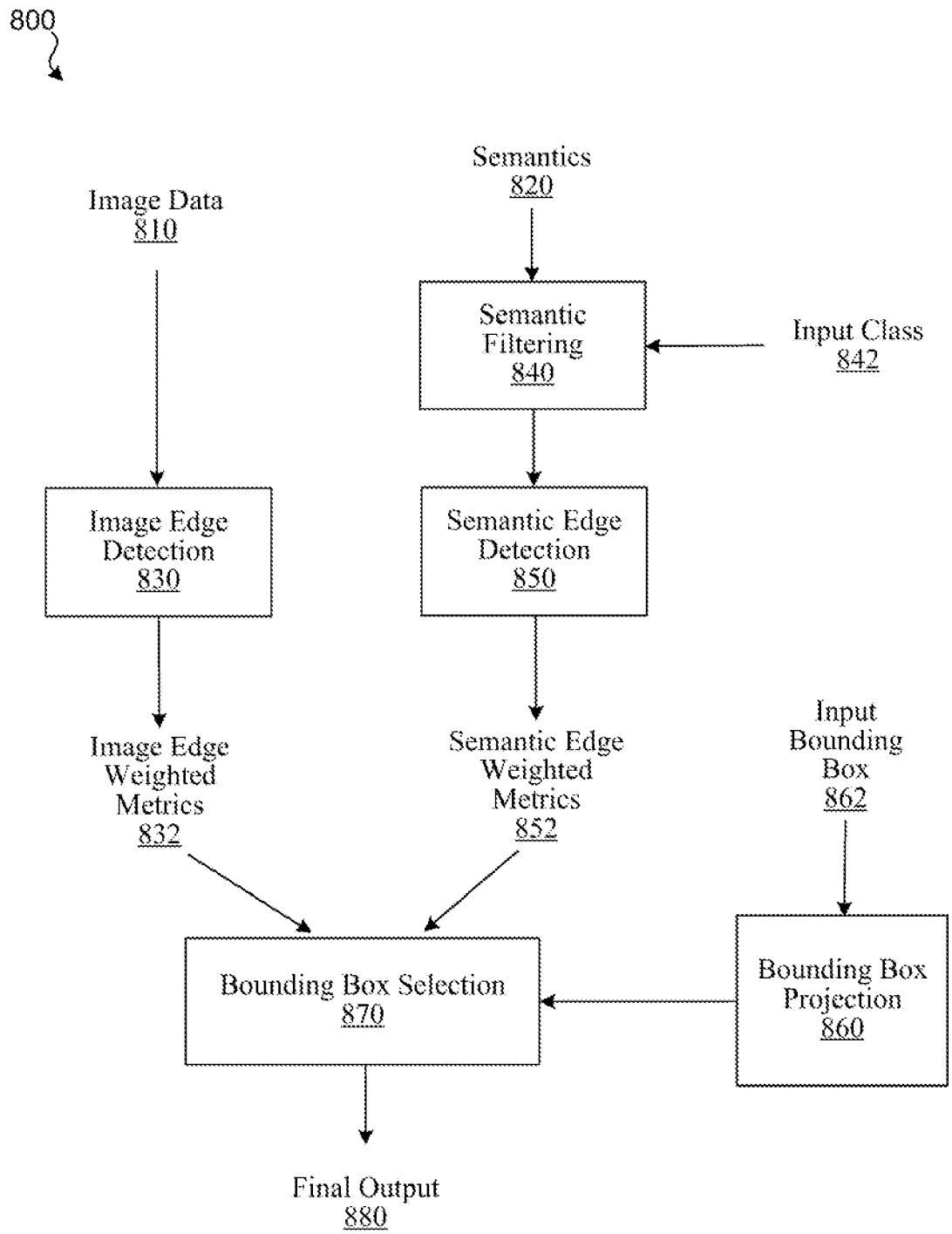
FIG. 8 is a flowchart illustrating inputs and outputs in a process for selecting a refined bounding box in accordance with some implementations.

FIG. 8 is a flowchart illustrating inputs and outputs in a process 800 for selecting a refined bounding box in accordance with some implementations. For example, the process 800 selects a refined bounding box for 3D elements (e.g., representations of objects of a physical environment). In this example, image data 810 and semantics 820 are generated from sensor data in a physical environment and input to a refinement process (e.g., floor plan boundary refinement block 644 of FIG. 6). Additionally, an input class 842 and input bounding box 862 are obtained from a floor planning module (e.g., floor plan block 616) or from another module/algorithm. In alternative implementations these inputs may vary. For example, the input class 842 may be included within the semantics 820.

The image edge detection module 830 processes the image data 810 (e.g., light intensity images such as RGB images) and generates image edge weighted metrics 832. For example, the image edge detection module 830 determines edges of 3D elements (e.g., objects such as representation 770 of desk 170) of the image data 810. In an exemplary embodiment, the image edge detection module 830 performs blurring, performs an edge detection technique to extract salient edges (e.g., a Canny edge detection process), may perform another blurring of the extracted edges, and then the image edge detection module 830 computes a weighting (e.g., a scoring metric) for each determined edge of the image data 810. The blurring of the image data may be used to spread out the edges to avoid detecting an edge for a single pixel value.

The semantic filtering module 840 processes the semantics 820 and generates filtered semantic data based on the classification provided by the input class 842. Semantics 820 may include semantic image data, such as a machine learning labeled version of the image data that provides the categories of detected elements. For example, semantics 820 may include a semantic label for each pixel so that edges of objects are more apparent and reliable to use to identify edges of objects.

The semantic edge detection module 850 processes the output of the semantic filtering module 840 and generates semantic edge weighted metrics 852. For example, the semantic edge detection module 850 determines edges of 3D elements (e.g., objects such as representation 770 of desk 170) of the semantics 820. In an exemplary embodiment, the semantic edge detection module 850 performs an edge detection technique to extract salient edges (e.g., a Canny edge detection process) and performs blurring of the extracted edges, and then the semantic edge detection module 850 computes a weighting (e.g., a scoring metric) for each determined edge of the semantics 820.

The bounding box projections module 860 obtains an input bounding box 862 (e.g., bounding box lines 772 for the representation 770 of the desk 170), and generates a series of bounding box proposals in all directions around the original position. The bounding box selection module 870 obtains the bounding box proposals from the bounding box projections module 860, the image weighted metrics 832 from the image detection module 830, the semantic edge weighted metrics 852 from the semantic edge detection module 850, computes a score for each of the bounding box proposals based on the RGB and semantic weightings, and determines the highest score. The bounding box selection module 870 then produces a final output 880 such as a best fit bounding box selection to be used for the live view and/or for the generation of a floor plan.

For example, as illustrated in the FIGS. 7A-7D, the bounding box line 772, which represents bounding box edges for the representation 770 of the desk 170, is updated and refined during a scanning process. In particular, view 700A illustrates a view of the beginning of the generation of the bounding box line 772 as the system determines a bounding box for the representation 770 of the desk 170. View 700B illustrates a more complete bounding box line 772 as the user scans more of the desk 170. Moreover, view 700C illustrates a more refined bounding box line 772 as the system implements the refinement process 800. For example, the bounding box line 772 in view 700B is not lined up with the edges of the representation 770 as well as in the view 700C (e.g., the bounding box line 772 matches the top of the representation 770 of the desk 170 in view 700C, but does not match exactly in view 700B). Additionally, the refinement of the bounding box lines 782 of the representation 782 in view 700C is refined and updated in view 700D as the system implements the refinement process 800, where a more refined bounding box is displayed (e.g., a 3D box) for the bounding box lines 782 of the representation 782.

Figure 9:
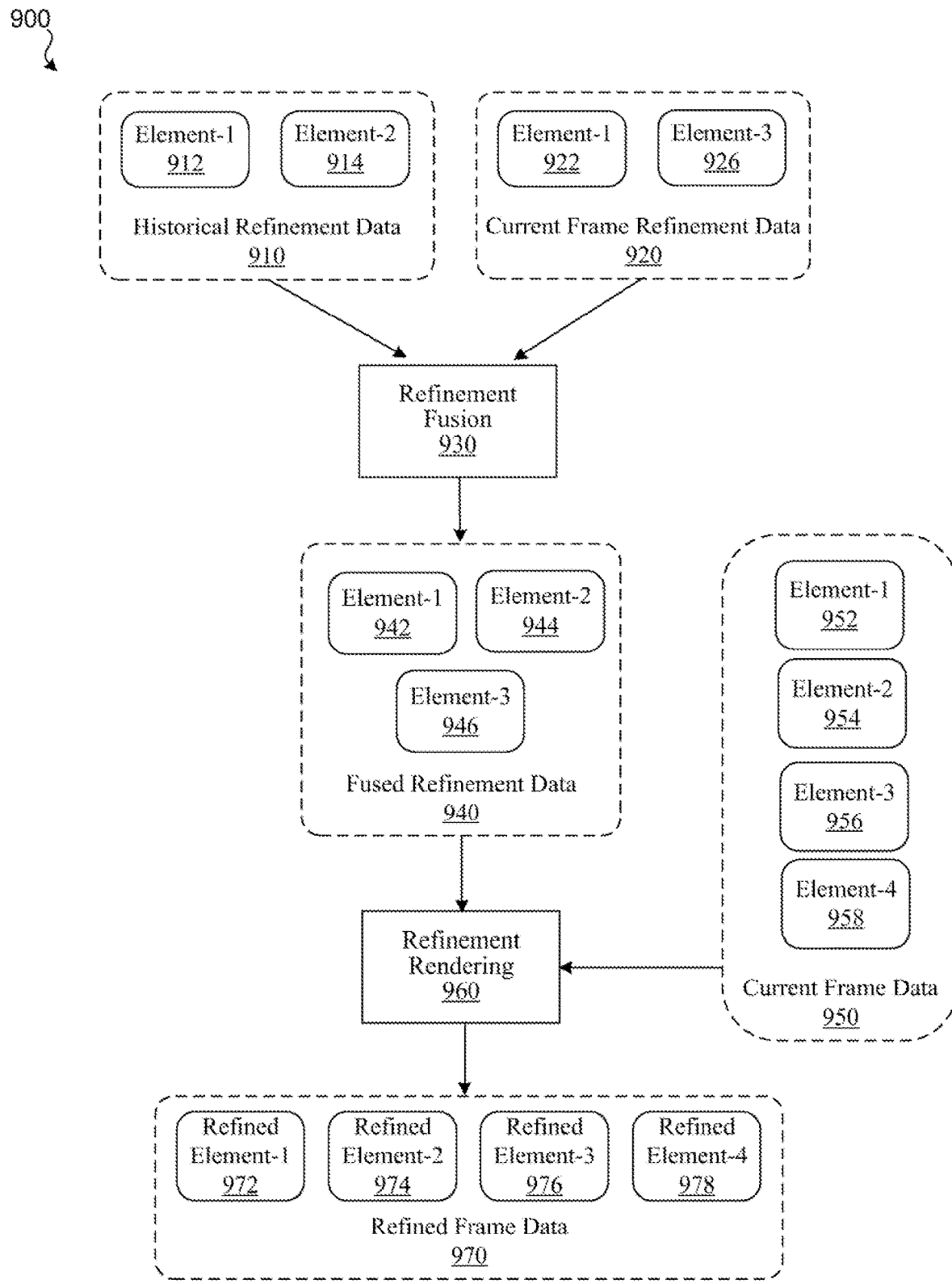
FIG. 9 is a flowchart illustrating inputs and outputs in a process for element refining in accordance with some implementations.

FIG. 9 is a flowchart illustrating inputs and outputs in a process 900 for element refining in accordance with some implementations. For example, the process 900 refines/adjusts lines of edges for 2D elements (e.g., representations of wall structures such as doors, doorways, windows, columns, etc. of a physical environment). In this example, historical data (e.g., sensor data acquired from previous frames) and current frame data are used together to determine refined frame data (e.g., updating the lines of detected edges during a live view as illustrated in FIGS. 7A-7D). The process 900 provides responsiveness (e.g., real-time or near real-time updates to wall structures during a live view), and temporal stability (e.g., refinement fusion logic to determine the most accurate and stable results). The refinement processes for each element described in process 900 (historical and/or current frame data) considers several factors/attributes for the refinement logic, including, but not limited to, edge pixel support, camera angle, visible length, a timestamp, or a combination thereof. The process 900 may include refining a position of an edge of a shape of a wall structure based a sequence of 2D images obtained during a scan by determining an edge adjustment for each frame of a set of prior frames (e.g., last 2-5 frames), and selecting and/or blending one of the edge adjustments based on at least one of aforementioned factors/attributes.

The process 900 includes a refinement fusion module 930 that acquires historical refinement data 910 (e.g., refinement information of one or more elements for previous frames of acquired sensor data), and current frame refinement data 920 (e.g., refinement information of one or more elements for current frames of acquired sensor data), and determines fused refinement data 940 (e.g., based on the refinement fusion logic described herein). As illustrated in FIG. 9, historical refinement data 910 includes refinement information for element-1 912 and element-2 914, current frame refinement data 920 includes refinement information for element-1 922 and element-3 926, and thus the combined fused refinement data 940 includes refinement information for element-1 942, element-2 944, and element-3 946. For example, based on one or more attributes (e.g., (1) edge pixel support-80% 90% current aligns more edge pixels, (2) which camera angle optimal for detecting edges, (3) visible size of current frame, and/or (4) timestamp), the refinement fusion module 930 will select which refinement version of each element is best. The refinement rendering module 960 obtains that selection for the fused refinement data 940 for each element, and information for the current frame data 950 (e.g., element-1 952, element-2 954, element-3 956, and element-4 958), and generates a rendering of the refinements for each element as refined frame data 970 (e.g., refined element-1 972, refined element-2 974, refined element-3 976, and refined element-4 978). For example, element 4 may include a newly detected edge of a wall that was not previously scanned (or refined), thus the refinement rendering module 960 renders the refined element-4 978 based on the element-4 958 information for the current frame data 950 (e.g., as the user scans the room of physical environment 100 towards the plant 180 and wall 126, the wall 126 becomes detected for the first time during the scanning process).

For example, as illustrated in the FIGS. 7A-7D, the lines for the detected wall structures (e.g., 2D elements such as wall structures: walls, floor, ceiling, doorways, windows, etc.). For example, view 700A illustrates lines 713a and 713b, which represents the corner between the wall representation 710a and the wall representation 710b, as noncongruent lines (e.g., not aligning) during the beginning of the scanning process. However, during a refine process, such as process 900, as additional frame data is acquired, the line 713 in view 700B is further refined and updated as one congruent line. Moreover, view 700D illustrates a more refined line 762 for the representation 760 of the window frame 160 than the line 762 in the view 700C and 700B as the system implements the refinement process 900 for each acquired current frame data 950.

Figure 10:
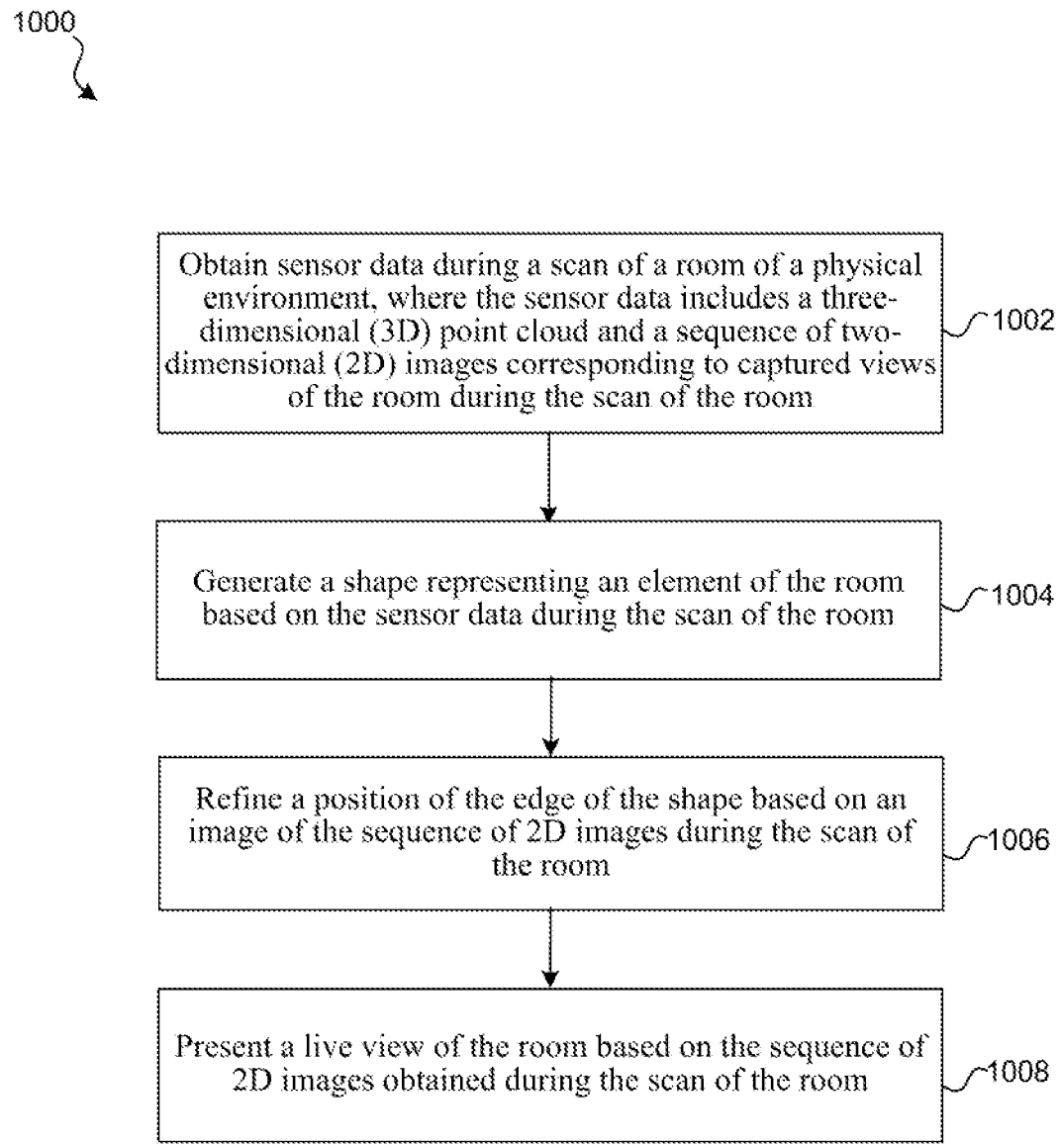
FIG. 10 is a flowchart illustrating a method for presenting a live view during a scanning process in accordance with some implementations.

FIG. 10 is a flowchart illustrating a process 1000 for presenting a live view during a scanning process. In some implementations, a device such as electronic device 110 performs method 1000. In some implementations, method 1000 is performed on a mobile device, desktop, laptop, HMD, or server device. The method 1000 is performed by processing logic, including hardware, firmware, software, or a combination thereof. In some implementations, the method 1000 is performed on a processor executing code stored in a non-transitory computer-readable medium (e.g., a memory).

At block 1002, the method 1000 obtains sensor data during a scan of a room of a physical environment. The sensor data may include a 3D point cloud and a sequence of 2D images corresponding to captured views of the room during the scan of the room. In some implementations, the sensor data includes image data (e.g., from an RGB camera), depth data (e.g., a depth image from a depth camera), ambient light sensor data (e.g., from an ambient light sensor), and/or motion data from one or more motion sensors (e.g., accelerometers, gyroscopes, etc.). In some implementations, the sensor data includes visual inertial odometry (VIO) data determined based on image data. The 3D point cloud may provide semantic information about one or more elements of the room. The 3D point cloud may provide information about the positions and appearance of surface portions within the physical environment. In some implementations, the 3D point cloud is obtained over time, e.g., during a scan of the room, and the 3D point cloud may be updated, and updated versions of the 3D point cloud obtained over time. For example, a 3D representation may be obtained (and analyzed/processed) as it is updated/adjusted over time (e.g., as the user scans a room, as illustrated in FIG. 7).

In some implementations, the 2D images correspond to a view that user may see during a live view (e.g., view 700 in FIG. 7). Alternatively, the 2D images that are captured during the scan of the room are an ultrawide image that is different than the live view shown to a user (e.g., additional sensor data is captured that is not displayed to the user during the scan). Additionally, in some implementations, the 2D images that are captured during the scan of the room include a semantically-labeled image corresponding to a live view and/or the ultra-wide view.

In some implementations, the 3D point cloud is associated with 3D semantic data that includes semantic labels associated with at least a portion of 3D points within the 3D point cloud. In some implementations, the semantic labels identify walls, wall structures, objects, and classifications of the objects of the room.

At block 1004, the method 1000 generates a shape (e.g., a 2D shape or a 3D primitive) representing an element of the room based on the sensor data during the scan of the room. For example, parameters of the shape may define the position/size of a wall, window, door, etc., or a bounding box representing one or more 3D objects in the room based on the 3D representation. The 2D shapes (e.g., rectangles or other polygons, circles, ellipses, etc.) may represent boundaries of the room based on the sensor data. The method 1000 may determine 3D positions for the 2D shapes based on the sensor data. Each of the 2D shapes may be defined by parameters specifying a plurality of points that define a position and a size of a respective 2D polygon in a 3D coordinate system.

In some implementations, a 3D primitive is determined (e.g., bounding box, cone, cylinder, wedge, sphere, torus, pyramid, etc.) representing a 3D object in the room based on the sensor data. The method 1000 may determine 3D positions for one or more 3D primitives (e.g., bounding boxes, cones, cylinders, wedges, spheres, torus, pyramids, etc.) representing one or more 3D objects in the room based on the sensor data. Each of the 3D primitives may be defined by parameters specifying a plurality of points that define a position and a size of a respective primitive in a 3D coordinate system. This determining may involve determining primitive parameters that specify opposing corners of the 3D primitive or sufficient vertices of the 3D primitive sufficient to specify its position and size in the 3D coordinate space.

In some implementations, determining 3D positions for the one or more 3D primitives may involve detecting the one or more 3D objects based on the 3D representation (e.g., as illustrated in block 620 of FIG. 6). Determining 3D positions for the one or more 3D primitives may involve refining object boundaries based on sensor data captured during the scan (e.g., as illustrated in block 622 of FIG. 6). Determining 3D positions for the one or more 3D primitives may involve aligning at least one of the one or more 3D primitive with at least one of the 2D shapes (e.g., as illustrated in block 624 of FIG. 6). Determining 3D positions for the one or more 3D primitives may involve producing data specifying the positions of the one or more 3D primitives.

At block 1006, the method 1000 refines a position of an edge of the shape based on an image of the sequence of 2D images obtained during the scan of the room. For example, the 2D images may be RGB images and/or filtered semantic images, and edge detection may be performed on the sequence of 2D images and those edges compared with edges of the shape during the scan of the room.

For 2D elements (e.g., walls, doors, doorways, windows, columns, etc., such as wall 120), RGB/semantic images, camera data, and the current parameters of the shape/3D floorplan may be used to determine an edge adjustment for each frame of a set of prior frames (e.g., last 2-5 frames) and selecting one or blending edge adjustments may be based on edge pixel support, camera angle, visible size of current frame, and a timestamp. In some implementations, edge adjustment may refer to changing the wall parameters in 3D, e.g., along direction orthogonal to normal such that the edge pixel support is maximized. In some implementations, selecting one or blending an edge based on edge pixel support may refer to an overlapping between the edge pixel detected in a 2D images (e.g., RGB image, semantic image, etc.) and the edges of wall/window/door in a world coordinate system when projected into an RGB image. In some implementations, selecting one or blending edge based on camera angle may refer to which camera angle is more perpendicular to the element that is desired to refine. In some implementations, selecting one or blending edge based on visible size of a current frame may refer a visible size related to the 3D wall/windows/door in the corresponding frames. In some implementations, determining the edge adjustment for each frame is based on 3D semantic data determined from the sensor data during the scan of the room.

For 3D elements (e.g., objects such as desk 170), the process may detect edges in the images, blur them, generate a series of bounding box proposals with changes in all directions, score those proposals based on the detected edges, and then choosing a proposal to use to adjust the shape based on the scoring. In some implementations, generating the shape representing the element of the room includes determining a 3D primitive (e.g., bounding box, cone, cylinder, wedge, sphere, torus, pyramid, etc.) representing the object based on the sensor data during the scan of the room. In some implementations, as illustrated in FIG. 8, refining the position of the edge of the shape based on an image of the sequence of 2D images obtained during the scan of the room includes detecting one or more edges for a set of images in the sensor data (e.g., extracting salient edges in both semantic data and RGB data), blurring the set of images (e.g., blurring so edges spread out—not just a single pixel), generating a series of bounding box proposals based on the blurred set of images, wherein each bounding box of the series of bounding box proposals varies based on edge adjustments in a different directions, scoring the series of bounding box proposals based on the detected on or more edges, and selecting a bounding box from the series of bounding box proposals to use to adjust the shape based on the scoring.

At block 1008, the method presents a live view of the room based on the sequence of 2D images obtained during the scan of the room. The live view includes a line positioned based on the refined position of the edge of the shape. For example, as illustrated in FIGS. 7A-7D, as the user scans the room over time, the bounding box lines and wall structure lines are updated/refined to better fit the element being scanned. In some implementations, the live view of the room includes a 2D floorplan and/or a 3D room plan that is produced during the scan.

In some implementations, the live view of the room includes a first field of view that is different than a second field of the view of the captured views of the room during the scan. For example, an ultrawide image is captured during the scan of the room corresponding to (but different than) the live view of the room. For example, the device may capture additional information for processing (edge detection/refinement) such that as the user is scanning the room, the live preview may be updated/refined in the smaller live view because the device has obtained additional data in a wider view for processing and/or refining one or more edges associated with one or more elements.

In some implementations, the live view (e.g., displaying a live preview of the physical environment and the lines and bounding boxes of the detected edges for the 2D and 3D elements) is being displayed to the user as the user is performing a scan. The updates to the detected edges may be performed for every frame. Alternatively, a scalable frame rate may be utilized for power performance (e.g., 10 fps-update the lines and bounding boxes every ten frames of acquired sensor data).

Figure 11:
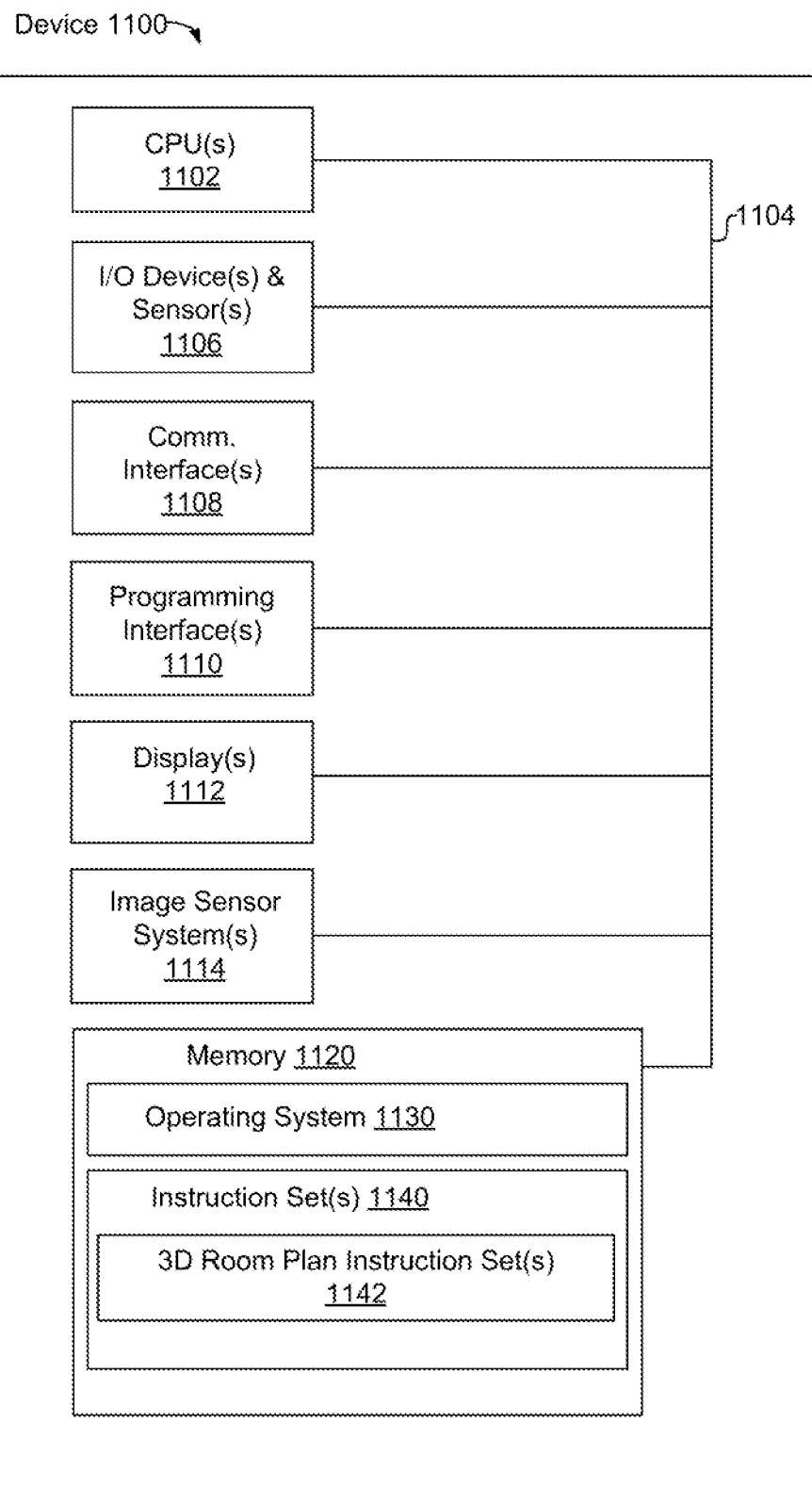
FIG. 11 is a block diagram of an electronic device of in accordance with some implementations.

FIG. 11 is a block diagram of electronic device 1100. Device 1100 illustrates an exemplary device configuration for electronic device 110. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1100 includes one or more processing units 1102 (e.g., microprocessors, ASICs, FPGAs, GPUs, CPUs, processing cores, and/or the like), one or more input/output (I/O) devices and sensors 1106, one or more communication interfaces 1108 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, 12C, and/or the like type interface), one or more programming (e.g., I/O) interfaces 1110, one or more output device(s) 1112, one or more interior and/or exterior facing image sensor systems 1114, a memory 1120, and one or more communication buses 1104 for interconnecting these and various other components.

In some implementations, the one or more communication buses 1104 include circuitry that interconnects and controls communications between system components. In some implementations, the one or more I/O devices and sensors 1106 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 1112 include one or more displays configured to present a view of a 3D environment to the user. In some implementations, the one or more displays 1112 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1100 includes a single display. In another example, the device 1100 includes a display for each eye of the user.

In some implementations, the one or more output device(s) 1112 include one or more audio producing devices. In some implementations, the one or more output device(s) 1112 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. The one or more output device(s) 1112 may additionally or alternatively be configured to generate haptics.

In some implementations, the one or more image sensor systems 1114 are configured to obtain image data that corresponds to at least a portion of a physical environment. For example, the one or more image sensor systems 1114 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1114 further include illumination sources that emit light, such as a flash. In various implementations, the one or more image sensor systems 1114 further include an on-camera image signal processor (ISP) configured to execute a plurality of processing operations on the image data.

The memory 1120 includes high-speed random-access memory, such as DRAM, SRAM, DDR RAM, or other random-access solid-state memory devices. In some implementations, the memory 1120 includes non-volatile memory, such as one or more magnetic disk storage devices, optical disk storage devices, flash memory devices, or other non-volatile solid-state storage devices. The memory 1120 optionally includes one or more storage devices remotely located from the one or more processing units 1102. The memory 1120 includes a non-transitory computer readable storage medium.

In some implementations, the memory 1120 or the non-transitory computer readable storage medium of the memory 1120 stores an optional operating system 1130 and one or more instruction set(s) 1140. The operating system 1130 includes procedures for handling various basic system services and for performing hardware dependent tasks. In some implementations, the instruction set(s) 1140 include executable software defined by binary information stored in the form of electrical charge. In some implementations, the instruction set(s) 1140 are software that is executable by the one or more processing units 1102 to carry out one or more of the techniques described herein.

The instruction set(s) 1140 include a 3D room plan instruction set 1142 configured to, upon execution, obtain sensor data, provide views/representations, select sets of sensor data, and/or generate 3D point clouds, 3D meshes, 3D floor plans, 3D room plans, and/or other 3D representations of physical environments as described herein. The instruction set(s) 1140 may be embodied as a single software executable or multiple software executables.

Although the instruction set(s) 1140 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

According to some implementations, the electronic devices (e.g., device 110) can generate and present an extended reality (XR) environment to one or more users. In contrast to a physical environment that people can sense and/or interact with without aid of electronic devices, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
      obtaining sensor data during a scan of a room of a physical environment, the sensor data comprising a three-dimensional (3D) point cloud and a sequence of two-dimensional (2D) images corresponding to captured views of the room during the scan of the room;
      generating a shape representing an element of the room based on the sensor data during the scan of the room;
      refining a position of an edge of the shape based on an image of the sequence of 2D images obtained during the scan of the room; and
      presenting a live view of the room based on the sequence of 2D images obtained during the scan of the room, wherein the live view comprises a line positioned based on the refined position of the edge of the shape.

2. The method of claim 1, wherein the element comprises a wall structure.

3. The method of claim 2, wherein refining the position of the edge of the shape of the wall structure based on the image of the sequence of 2D images obtained during the scan comprises:
   determining an edge adjustment for each frame of a set of prior frames; and
   selecting one of the edge adjustments based on at least one of: (a) an edge pixel support, (b) a camera angle, (c) a visible size of a current frame, and (d) a timestamp.

4. The method of claim 2, wherein refining the position of the edge of the shape of the wall structure based on the image of the sequence of 2D images during the scan of the room comprises:
   determining an edge adjustment for each frame of a set of prior frames; and
   blending one or more edge adjustments based on at least one of: (a) an edge pixel support, (b) a camera angle, (c) a visible size of a current frame, and (d) a timestamp.

5. The method of claim 3, wherein determining the edge adjustment for each frame is based on 3D semantic data determined from the sensor data during the scan of the room.

6. The method of claim 1, wherein the element comprises an object in the room.

7. The method of claim 6, wherein generating the shape representing the element of the room comprises determining a 3D primitive representing the object based on the sensor data during the scan of the room.

8. The method of claim 7, wherein refining the position of the edge of the shape based on an image of the sequence of 2D images obtained during the scan of the room comprises:
   detecting one or more edges for a set of images in the sensor data;
   blurring the set of images;
   generating a series of bounding box proposals based on the blurred set of images, wherein each bounding box of the series of bounding box proposals varies based on edge adjustments in a different directions;
   scoring the series of bounding box proposals based on the detected on or more edges; and
   selecting a bounding box from the series of bounding box proposals to use to adjust the shape based on the scoring.

9. The method of claim 1, wherein generating the shape representing the element of the room based on the sensor data during the scan of the room comprises detecting walls and wall openings.

10. The method of claim 1, wherein generating the shape representing the element of the room based on the sensor data during the scan of the room comprises detecting windows or doors on walls of the room.

11. The method of claim 1, wherein the live view of the room comprises a first field of view that is different than a second field of the view of the captured views of the room during the scan.

12. The method of claim 1, wherein the shape comprises one or more parameters defining a position or size of the shape that are modified during the scan of the room.

13. The method of claim 1, wherein the sequence of 2D images comprises light intensity image data.

14. The method of claim 1, wherein the sequence of 2D images comprises filtered semantic data.

15. The method of claim 1, wherein the 3D point cloud is associated with 3D semantic data that includes semantic labels associated with at least a portion of 3D points within the 3D point cloud.

16. The method of claim 15, wherein the semantic labels identify walls, wall structures, objects, and classifications of the objects of the room.

17. The method of claim 1, wherein the live view of the room comprises a floorplan that is produced during the scan.

18. A system comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the system to perform operations comprising:
   obtaining sensor data during a scan of a room of a physical environment, the sensor data comprising a three-dimensional (3D) point cloud and a sequence of two-dimensional (2D) images corresponding to captured views of the room during the scan of the room;
   generating a shape representing an element of the room based on the sensor data during the scan of the room;
   refining a position of an edge of the shape based on an image of the sequence of 2D images obtained during the scan of the room; and
   presenting a live view of the room based on the sequence of 2D images obtained during the scan of the room, wherein the live view comprises a line positioned based on the refined position of the edge of the shape.

19. The system of claim 18, wherein the element comprises a wall structure, wherein refining the position of the edge of the shape of the wall structure based on the image of the sequence of 2D images obtained during the scan comprises:
   determining an edge adjustment for each frame of a set of prior frames; and
   selecting or blending one of the edge adjustments based on at least one of: (a) an edge pixel support, (b) a camera angle, (c) a visible size of a current frame, and (d) a timestamp.

20. A non-transitory computer-readable storage medium storing program instructions executable via one or more processors to perform operations comprising:
   obtaining sensor data during a scan of a room of a physical environment, the sensor data comprising a three-dimensional (3D) point cloud and a sequence of two-dimensional (2D) images corresponding to captured views of the room during the scan of the room;
   generating a shape representing an element of the room based on the sensor data during the scan of the room;
   refining a position of an edge of the shape based on an image of the sequence of 2D images obtained during the scan of the room; and
   presenting a live view of the room based on the sequence of 2D images obtained during the scan of the room, wherein the live view comprises a line positioned based on the refined position of the edge of the shape.

* * * * *